United States Patent
Gu et al.

(10) Patent No.: US 10,821,608 B2
(45) Date of Patent: Nov. 3, 2020

(54) METHOD OF ROBOT ARM FLEET POSITION CONTROL WITH WIRELESS CHARGING TIME

(71) Applicant: International Business Machines Corporation, Armonk, NY (US)

(72) Inventors: Yu Gu, Cedar Park, TX (US); Dingcheng Li, Sunnyvale, CA (US); Kai Liu, Malden, MA (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 15/791,343

(22) Filed: Oct. 23, 2017

(65) Prior Publication Data
US 2019/0118382 A1 Apr. 25, 2019

(51) Int. Cl.
*B25J 9/16* (2006.01)
*G05B 19/418* (2006.01)
(Continued)

(52) U.S. Cl.
CPC ........... *B25J 9/1694* (2013.01); *B25J 9/1682* (2013.01); *G01S 13/758* (2013.01);
(Continued)

(58) Field of Classification Search
CPC ....... B25J 9/1694; H02J 7/025; G01S 13/758; G01S 13/878; G01S 5/02;
(Continued)

(56) References Cited

U.S. PATENT DOCUMENTS 4,433,382 A   2/1984   Cunningham et al.
6,184,651 B1  2/2001   Fernandez et al.
              (Continued)

FOREIGN PATENT DOCUMENTS

EP  1717660 A3   2/2006
JP  4745853 B2 * 8/2011
              (Continued)

OTHER PUBLICATIONS

Translation in English: JP-4745853-B2 (Year: 2011).*
(Continued)

*Primary Examiner* — Abby Y Lin
*Assistant Examiner* — Mohammad Mazharul Islam
(74) *Attorney, Agent, or Firm* — North Shore Patents, P.C.; Joseph L. Acayan (57) ABSTRACT

Embodiments generally relate to robots and enabling robots to locate objects in a physical environment. In some embodiments, a method includes charging a radio-frequency identification (RFID) tag with an RFID reader, where the RFID tag is coupled to an object, and where the RFID reader is coupled to a robot arm. The method further includes receiving a plurality of responses from the RFID tag, where each response includes a power value to which the RFID tag was charged and a time value for charging the RFID tag to the power value. The method further includes moving the RFID reader to a plurality of RFID reader positions using the robot arm, where each RFID reader position is associated with one of the responses of the plurality of responses. The method further includes determining a plurality of distances from the RFID reader to the RFID tag based on power values and the time values of the respective responses at the respective RFID reader positions. The method further includes determining a location of the RFID tag based on the plurality of distances.

19 Claims, 5 Drawing Sheets

(51) Int. Cl.
*G01S 13/75* (2006.01)
*H02J 7/02* (2016.01)
*G05B 19/12* (2006.01)
*G06K 17/00* (2006.01)
*G06K 7/10* (2006.01)
*G06Q 10/08* (2012.01)
*G05B 19/042* (2006.01)

(52) U.S. Cl.
CPC .......... *G05B 19/4183* (2013.01); *H02J 7/025* (2013.01); *G05B 19/0426* (2013.01); *G05B 19/12* (2013.01); *G05B 2219/36371* (2013.01); *G05B 2219/42337* (2013.01); *G06K 7/10297* (2013.01); *G06K 7/10376* (2013.01); *G06K 17/0022* (2013.01); *G06Q 10/087* (2013.01)

(58) Field of Classification Search
CPC ....... G05B 2219/42337; G06K 7/0008; G06K 7/10079; G07G 1/009; G06Q 10/087; G06Q 30/0631; G06Q 30/0641; A01K 11/006; A61B 19/2203; A61B 2019/448; A61B 2019/4815; G05D 1/0261; G05D 1/102; G05D 2201/0207
See application file for complete search history.

(56) References Cited

U.S. PATENT DOCUMENTS

| | | | |
|---|---|---|---|
| 7,558,647 B2 | 7/2009 | Okazaki | |
| 7,967,870 B2 | 6/2011 | Ko | |
| 8,659,397 B2 * | 2/2014 | Vargo | G06K 7/0008 340/10.4 |
| 9,367,785 B2 * | 6/2016 | Sabesan | G01S 7/42 |
| 9,492,923 B2 | 11/2016 | Wellman et al. | |
| 2009/0069943 A1 | 3/2009 | Akashi et al. | |
| 2010/0286826 A1 | 11/2010 | Tsusaka et al. | |
| 2010/0328073 A1 * | 12/2010 | Nikitin | G01S 5/0247 340/572.1 |
| 2012/0286730 A1 | 11/2012 | Bonny | |
| 2013/0181869 A1 * | 7/2013 | Chawla | G06K 7/0008 342/451 |
| 2013/0338820 A1 | 12/2013 | Corbett et al. | |
| 2014/0128107 A1 | 5/2014 | An | |
| 2014/0180479 A1 | 6/2014 | Argue et al. | |
| 2014/0285317 A1 | 9/2014 | Shimizu et al. | |
| 2015/0032252 A1 | 1/2015 | Galluzzo et al. | |
| 2015/0048789 A1 | 2/2015 | Kim et al. | |
| 2016/0250752 A1 | 9/2016 | Djugash et al. | |

FOREIGN PATENT DOCUMENTS

| | | |
|---|---|---|
| KR | 100791622 B1 * | 1/2008 |
| WO | 2013034127 A2 | 3/2013 |
| WO | 2015100899 A1 | 7/2015 |
| WO | 2016149255 A1 | 9/2016 |

OTHER PUBLICATIONS

Translation in English: KR-100791622-B1 (Year: 2008).*
Begum, N. Firthous, et al., "Design and Implementation of Pick and Place Robot with Wireless Charging Application", International Journal of Science and Research (IJSR), vol. 4 Issue 2, Feb. 2015.
Modern Materials Handling Staff, "Industrial robotics market to reach $44.48 billion by 2020", Modern Materials Handling, http://www.mmh.com/article/industrial_robotics_market_to_reach_44.48_billion_by_2020, May 25, 2015.
RFID Journal, "Microelectronics Technology Inc. and Enso Detego Introduce FiND-iT", RFID Journal, http://www.rfidjournal.com/articles/view?10642, Apr. 30, 2013.
Robotics Stack Exchange, "Calculate object distance with camera", Stack Exchange Inc., https://robotics.stackexchange.com/questions/4296/calculate-object-distance-with-camera, [retrieved Oct. 9, 2017].
Yang, Lei, et al., "Tagoram: Real-Time Tracking of Mobile RFID Tags to High Precision Using COTS Devices", pp. 237-248, ACM, Sep. 2014.
Shu, Yuanchao et al., "TOC: Localizing Wireless Rechargeable Sensors with Time of Charge", IEEE Conference on Computer Communications, pp. 388-396, IEEE, 2014.
Zhang, Jun, et al., "Battery Swapping and Wireless Charging for a Home Robot System with Remote Human Assistance", IEEE Transactions on Consumer Electronics, vol. 59 Issue 4, pp. 747-755, IEEE, Dec. 23, 2013.
Zhao, Yi, et al., "A battery-free RFID-based indoor acoustic localization platform", IEEE International Conference on RFID, pp. 110-117, 2013.

* cited by examiner

METHOD OF ROBOT ARM FLEET POSITION CONTROL WITH WIRELESS CHARGING TIME

BACKGROUND

Robot arms have been widely used in environments associated with manufacturing, warehouse inventory, etc. A person may, for example, place items in a bin or on a shelf, and robots may be used to move heavy bins and/or shelves from one location to another in a particular environment. With advancement in wireless charging and radio-frequency identification (RFID) tags, many products have been integrated with RFID tags. RFID tags may be used to identify particular objects for general handling. There are often a large number of robot arms to be controlled and positioned simultaneously, which is challenging and expensive.

SUMMARY

Disclosed herein is a method for locating objects in a physical environment, and system and computer program product as specified in the independent claims. Embodiments are given in the dependent claims. Embodiments can be freely combined with each other if they are not mutually exclusive.

Embodiments determine locations of objects based on distances between robot arms and the objects. Embodiments determine the distances based on the wireless charging time of the RFID tags attached to objects by RFID readers attached to robot arms at different RFID readers' positions.

In an embodiment, a method includes charging an RFID tag with an RFID reader, where the RFID tag is coupled to an object, and where the RFID reader is coupled to a robot arm. The method further includes receiving a plurality of responses from the RFID tag, where each response includes a power value to which the RFID tag was charged and a time value for charging the RFID tag to the power value. The method further includes moving the RFID reader to a plurality of RFID reader positions using the robot arm, where each RFID reader position is associated with one of the responses of the plurality of responses. The method further includes determining a plurality of distances from the RFID reader to the RFID tag based on power values and the time values of the respective responses at the respective RFID reader positions. The method further includes determining a location of the RFID tag based on the plurality of distances.

In another embodiment, the method further includes moving the robot arm to the object based on the location of the RFID tag. In another aspect, each time value is an interval between a start time of the RFID tag being charged and a response time that one of the responses was received. In another aspect, the RFID tag is simultaneously charged by a plurality of RFID readers of different robot arms, and where the RFID reader is charging a plurality of RFID tags, where the determining of the plurality of distances is based on combined power values. In another aspect, the RFID tag is simultaneously charged by a plurality of RFID readers of different robot arms, and where the RFID reader is charging a plurality of RFID tags, where the number of RFID positions is based on the number RFID tags being charged by the RFID reader. In another aspect, the RFID tag is simultaneously charged by a plurality of RFID readers of different robot arms, and where the RFID reader charges a plurality of RFID tags, where the method further includes determining a plurality of distances from the RFID reader to the RFID tag based on power values and the time values from the plurality of RFID tags. In another aspect, the charging of the RFID tag is performed wirelessly.

DETAILED DESCRIPTION

Embodiments described herein facilitate in locating objects so they can be moved, mapped, and/or inventoried, etc. in a physical environment such as a warehouse or other area that contains objects such as inventory items. Embodiments determine locations of objects based on distances between robot arms and the objects. Embodiments determine the distances based on the wireless charging time of RFID tags attached to objects by RFID readers attached to robot arms at different RFID reader (robot arm) positions.

In some embodiments, a system charges an RFID tag with an RFID reader, where the RFID tag is coupled to an object, and where the RFID reader is coupled to a robot arm. The system receives responses from the RFID tag via the RFID reader, where each response includes a power value to which the RFID tag was charged and a time value for charging the RFID tag to the power value. In various embodiments, the charging of the RFID tag is for the purpose of reading the amount charged and the charging time, and putting the values (e.g., charge value and time value) through a formula or function to determine the distance of the RFID tag to the RFID reader. This distance approximates the distance of the object to which the RFID tag is attached to the robot arm to which the RFID reader is attached. In various embodiments, the system moves the RFID reader (or causes the robot arm to move the RFID reader) to multiple RFID reader positions, where each RFID reader position is associated with one of the responses. As described in more detail herein, taking multiple readings (responses) from different known positions is for the purpose of determining the relative location of the object. The system then determines distances from the RFID reader to the RFID tag based on power values and the time values of the respective responses at the respective RFID reader positions. The system then determines a location of the RFID tag based on plurality of distances.

Figure 1:
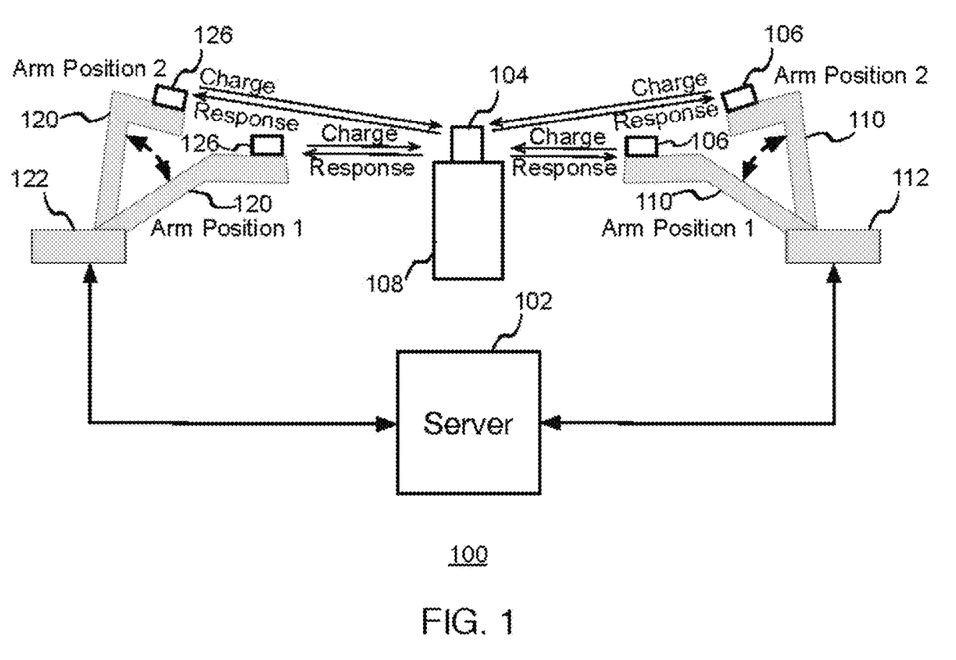
FIG. 1 is an example environment with robots that handle the objects, according to some embodiments.

FIG. 1 is an example environment 100 with robots that handle the objects, according to some embodiments. Shown is a server 102. As described in more detail herein, the server 102 causes an RFID tag 104 to be charged by an RFID reader 106. The RFID tag 104 is attached to or mounted on an object 108, and the RFID reader 106 is attached or mounted to a robot arm 110 of a robot 112. In various embodiments, the RFID reader 106 includes an RFID charger that charges the RFID tag 104 by sending charging signals to the RFID tags. As such, the term RFID reader may be used interchangeably with the terms RFID charger and RFID reader-charger.

In various embodiments, environment 100 may be, for example, a warehouse having a large number of objects or items shelved at multiple locations throughout the warehouse. Environment 100 may represent other environments such as a manufacturing floor, etc., and will depend on the particular embodiment.

For ease of illustration, one object 104 is shown. In various scenarios, there may be hundreds or thousands of objects in environment 100.

Also shown are two arm positions (labeled "Arm Position 1" and "Arm Position 2") of robot arm 110. As described in more detail herein, the RFID reader 106 sends a charge or charging signal to the RFID tag 104, and the RFID tag 104 sends a response to the RFID reader 106. This charge-response exchange occurs at different positions of the robot arm 110.

For ease of illustration, the robot arm 110 appears to be moving up and down (vertically). In various embodiments, the robot arm 110 may move vertically, horizontally, or a combination thereof (e.g., x-direction, y-direction, and z-direction). In various embodiments, knowing different locations of the RFID reader 106 and corresponding distances between the RFID tag 104 and the RFID reader 106 at those positions enables the system to triangulate the location of the RFID tag 104 (and thus the location of the object 108).

Some embodiments are described herein in the context of a single RFID tag and a single RFID reader, for ease of illustration. These embodiments and others also apply to multiple RFID tags and multiple RFID readers, as is a likely scenario in a warehouse where there may be multiple robots handing multiple items. For example, the server 102 also causes the RFID tag 104 to be charged by an RFID reader 126, where the RFID reader 126 is attached or mounted to a robot arm 120 of a robot 122. As described in more detail herein, two RFID readers may charge a single RFID tag due to their proximity to the RFID tag.

Shown are two arm positions (labeled "Arm Position 1" and "Arm Position 2") of robot arm 120. The RFID reader 126 sends a charge or charging signal to the RFID tag 104, and the RFID tag 104 sends a response to the RFID reader 126. This charge-response exchange occurs at different positions of the robot arm 120.

As with the robot arm 110, the robot arm 120 appears to be moving up and down (vertically). In various embodiments, the robot arm 120 may move vertically, horizontally, or a combination thereof (e.g., x-direction, y-direction, and z-direction). As described in more detail herein, the multiple positions and resulting distances enables the system in triangulating the location of the RFID tag 104 (and object 108).

While the server 102 is shown to connect with robots 112 and 122 via wired connection, the charge/response two way arrows shown represent communication between server 102 and robots 112 and 122. In various embodiments, server 102 may communicate with robots 102 and 122 via wired and/or wireless connections associated with any suitable network or combination of networks.

While the server 102 performs embodiments described herein, in other embodiments, any suitable component or combination of components associated with the server 102 or any suitable processor or processors associated with a robot may facilitate performing the embodiments described herein. In various embodiments, the environment 100 may not have all of the components shown and/or may have other elements including other types of components instead of, or in addition to, those shown herein. For example, in some embodiments, each robot may include a computer system, where the computer system in the robot may perform the embodiments described herein.

Figure 2:
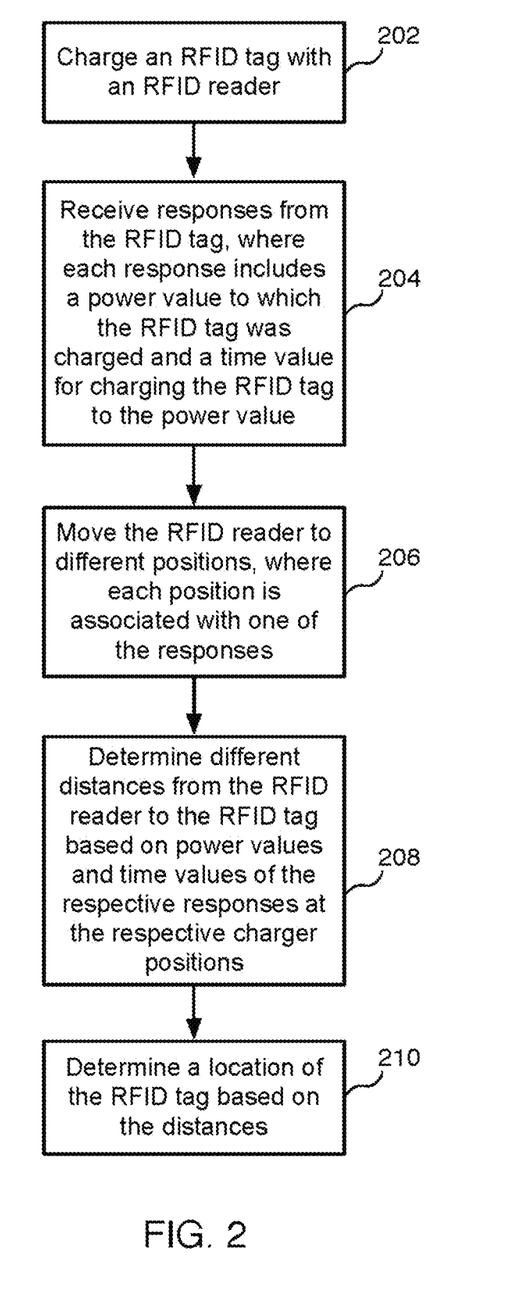
FIG. 2 is an example flow diagram for locating an object, according to some embodiments.

FIG. 2 is an example flow diagram for locating an object in a three-dimensional space, according to some embodiments. As described in more detail herein, the system determines the location of an object based on relative distances between an RFID tag attached to the object and one or more RFID readers at different positions. Referring to both FIGS. 1 and 2, a method begins at block 202, where a system such as server 102 charges an RFID tag 104 using an RFID reader 106. As indicated herein, the term RFID reader may be used interchangeably with the terms RFID charger and RFID reader-charger. As indicated herein, the RFID tag 104 is coupled to an object such as the object 108, and the RFID reader 106 is coupled to the robot arm 110. In various embodiments, the charging of the RFID tag is performed wirelessly.

In various embodiments, the RFID tag 104 may be simultaneously charged by multiple RFID readers such as RFID reader 106 and 126 at different respective robot arms 110 and 120. In various embodiments, the RFID reader 106 may charge multiple RFID tags. In some embodiments, this may be used to determine the locations of multiple RFID tags concurrently. As described in more detail herein, the system may determine the distances between the RFID tag 104 and different positions of the RFID reader 106 based on combined power values. For example, the power values may include a sum of power values from different RFID readers. Various embodiments involving combined power values are described in more detail herein.

For ease of illustration, one RFID tag 104 is shown as being charged and sending corresponding responses. Embodiments described herein may be applied to each RFID tag of many RFID tags. In some embodiments, the system may determine multiple distances from the RFID reader 106 to the RFID tag 104 based on power values and the time values from multiple RFID tags.

For ease of illustration, two arm positions of robot arms 110 and 120 are shown. The actual number of arm positions may vary, and will depend on the particular embodiment. As described in more detail herein, the number of RFID positions may be based on the number of RFID tags being charged by the RFID reader.

At block 204, the system receives responses from the RFID tag 104 via the RFID reader 106. As described in more detail herein, each response includes a power value to which the RFID tag 104 was charged and includes a time value for charging the RFID tag 104 to the power value. Example embodiments involving power values and power times are described in more detail herein. As described in more detail herein, each time value is an interval between the start time of the RFID tag 104 being charged and a response time that a particular response is received at the RFID reader 106. The term power value may be used interchangeably with the term power level, and the term time value may be used interchangeably with the terms time duration, interval, charge time, charging time, charge duration, and charge interval.

At block 206, the system moves the RFID reader 106 to different positions, where each position is associated with one of the responses. In other words, in various embodiments, the RFID reader 106 may receive multiple responses from the RFID tag at each position, where the RFID reader then sends the responses to the system from each position.

At block 208, the system determines different distances from the RFID reader 106 to the RFID tag 104 based on power values and time values of the respective responses at the respective reader positions. Example embodiments involving the power values and time values are described in more detail herein.

At block 210, the system determines a location of the RFID tag 104 in the physical environment based on the distances. By knowing the location of the RFID tag 104 in the physical environment (e.g., in a three-dimensional space), the system also knows the location of the object 108 in the three-dimensional space, as the RFID tag 104 is attached to the object 108.

After the system determines the location of the RFID tag, the system may move the robot arm 110 to the object 108 based on the location of the RFID tag. The robot arm 110 may then grab and pick up the object 108 and may transport and place the object 108 in a different location.

While some embodiments are described herein in the context of RFID tags, where the location of RFID tags are determined. These embodiments are not limited to RFID tags.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 3:
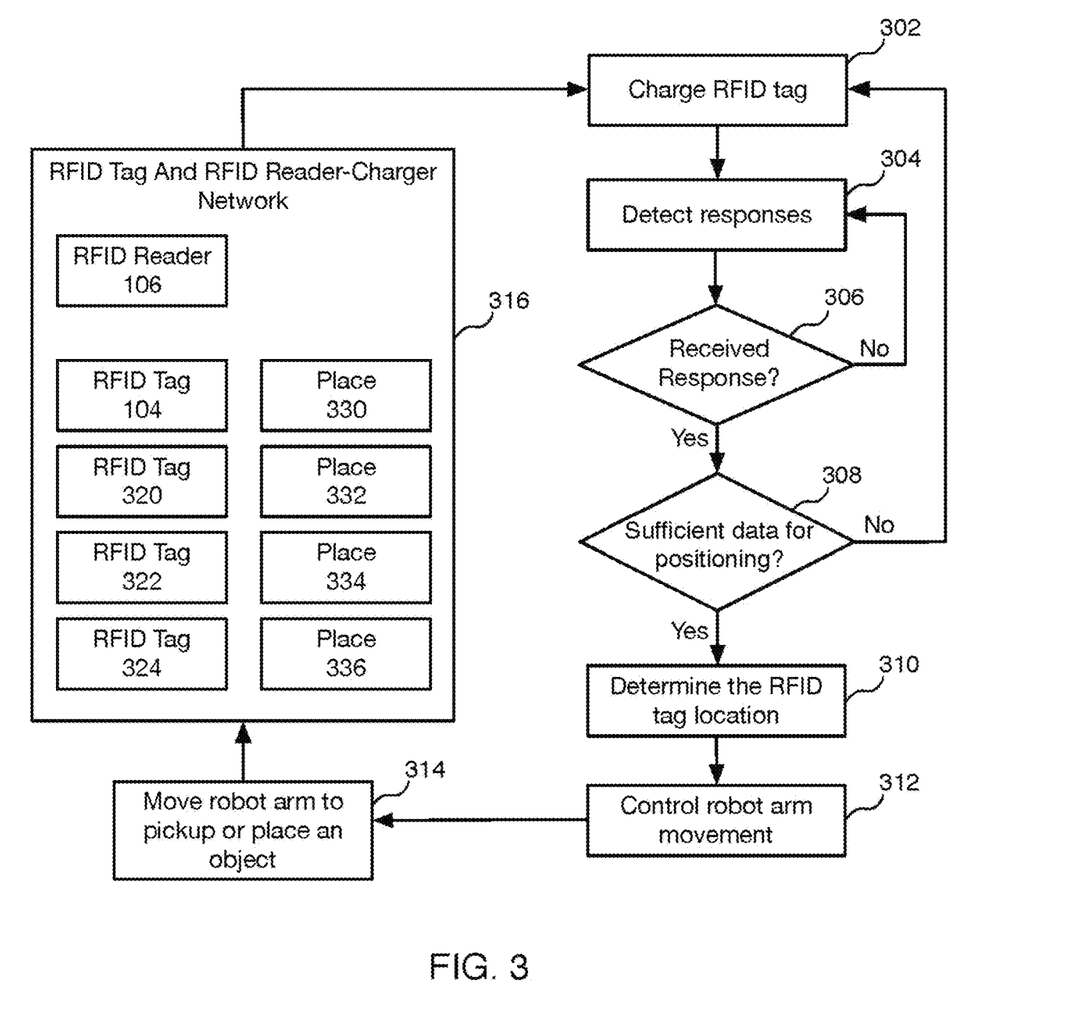
FIG. 3 is an example flow diagram for locating an object based on a single robot, according to some embodiments.

FIG. 3 is an example flow diagram for locating an object based on a single robot, according to some embodiments. Referring to FIGS. 1 and 3, a method begins at block 302, where a system such as server 102 charges the RFID tag 104 using RFID reader 106. In some embodiments, the system may include a charging power controller that sends control signals to the RFID reader 106. The charging power control may be an enhanced controller that dynamically determines and calibrates the charging power. The dynamic charging power facilitates in improving the positioning accuracy of the robot arm 110 and provides services for continuous object tracking.

At block 304, the system detects responses from the RFID tag 104 via the RFID reader 106. In some embodiments, the system may include a query response listener, which is a module that continuously monitors the responses from RFID tags when they are charged to a predetermined threshold, where RFID tags respond to the query message from the RFID reader 106 or from the system via the RFID reader 106.

At block 306, the system determines if a response has been received from the RFID tag 104. If not, the system continues to detect responses. If so, at block 308, the system determines if there is sufficient data for determining positioning. For example, sufficient data may include a power value or level to which the RFID tag 104 has been charged and a time value or time duration for charging the RFID tag 104 to the power value.

At block 310, the system determines the location of the RFID tag 104. As described herein, to determine the location of the RFID tag 104, the system determines the distance between the RFID tag 104 and the RFID reader 106 based on a power value and a time value. Embodiments directed to the power value and the time value are described in more detail herein.

In some embodiments, the system may include an RFID tag location estimator, which is an enhanced machine learning module that correlates the power value with the time value to estimate the RFID tag-to-RFID reader distance, at different distances, and then estimates the location of the RFID tag 104 based on these correlations. In various embodiments, the power value or power level is inversely proportional to the distance from the RFID tag 104 and the RFID reader 106. Also, the time to finish charging the RFID tag 104 is proportional to the distance from the RFID tag 104 and the RFID reader 106. As such, the longer the distance from the RFID tag 104 and the RFID reader 106, the less charge and longer charging time. As such, the system may determine the distance using the known power value and a known time value provided by the RFID tag 104. Further example embodiments are described in more detail herein. In some embodiments, 3 different distances may be used to estimate the location of the RFID tag 104 by triangulation.

At block 312, the system controls the robot arm 110 of robot 112 to move the robot arm 110. In some embodiments, the system may include a robot arm movement controller, which is an enhanced controller that determines the next position of the robot arm to obtain another charger-tag distance, such that the positioning results (location of the RFID tag 104) may be optimized.

At block 314, the system may, after the location of the RFID tag 104 is determined, move the robot arm to the RFID tag 104 to pick up or place the object 108 in a particular location.

At block 316, the RFID reader 106 may charge multiple RFID tags such as the RFID tag 104, the RFID tag 320, the RFID tag 322, and the RFID tag 324, which are attached to physical objects that need to be picked up. The location of each object is determined according to wireless charging times and power values, as described herein. In some embodiments, the RFID reader 106 may also read and capture other information stored on a tag in addition to charge times and power values. For example, the RFID reader 106 may read information such as object category, destination area (e.g., place 330, etc.), etc. Such information enables a robot to place an object in the right place (e.g., Place 330, etc.).

Figure 4:
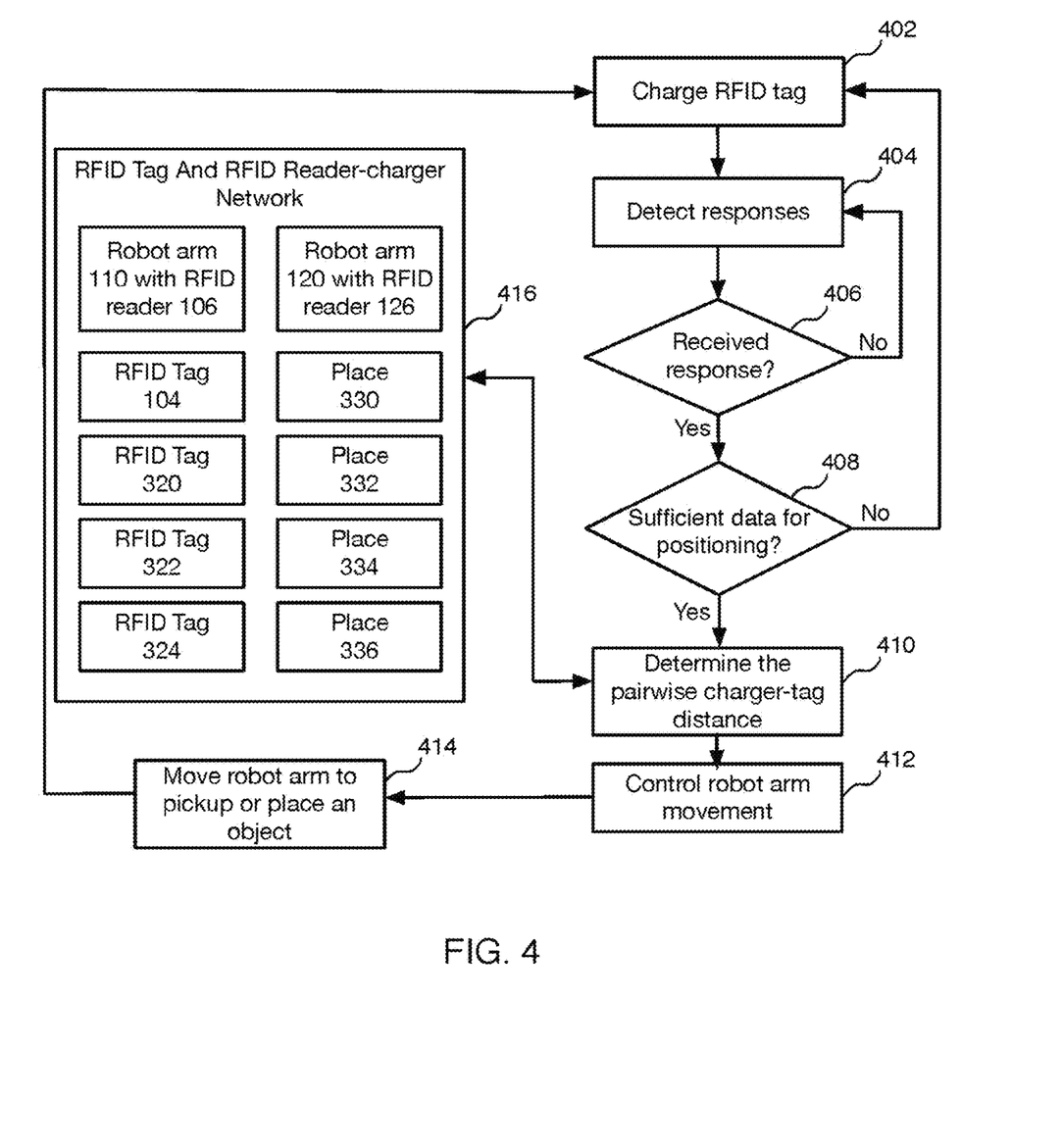
FIG. 4 is an example flow diagram for locating an object based on multiple robots, according to some embodiments.

FIG. 4 is an example flow diagram for locating an object based on multiple robots, according to some embodiments. While some embodiments described herein are described in the context of a single robot and robot arm, the embodiment and others also apply to scenarios involving multiple robots' robot arms. FIG. 4 describes a flow embodiment similar to that of FIG. 3, except that the flow embodiment of FIG. 4 involves multiple robots.

Referring to FIGS. 1, 3, and 4, blocks 402, 404, 406, 408, 412, and 414 are substantially the same as blocks 302, 304, 306, 308, 412, and 314, respectively, except that the system receives responses from all RFID tags to all RFID readers. Another unique aspect of the flow diagram of FIG. 4 involving multiple robots (and multiple RFID readers contributing to the charging a single RFID tag) is block 410.

At block 410, the system determines the pairwise distance between the RFID tag 104 and the RFID reader 106 and the RFID reader 126. In some embodiments, the system includes a pairwise charger-tag distance estimator, which is an enhanced module that correlates a time value (charging time T) from all RFID tags to all RFID readers and solves a linear equation in order to find the charging power P resulting from a particular RFID reader at a given RFID tag. In various embodiments, the system converts pairwise charging power to a pairwise distance between an RFID tag and an RFID charger.

At block 416, RFID readers 106 and 126 are charging each RFID tag (e.g., RFID tag 104) simultaneously. Each tag is attached to physical object that needs to be picked up.

Since RFID readers 106 and 126 are charging the same tag at the same time, linear equation will be used to calculate the amount of power from each charger. The location of object is determined according to wireless charging times and power values as described herein. In addition to power values and charge times, each RFID reader 106 and 126 may also read and capture other information stored on a given RFID tag (e.g., RFID tag 104), like object category, destination area (e.g., place 330), etc., and put an object in the right place (e.g., place 330).

In some embodiments, the system determines a reader/charger-tag pair distance for multiple RFID readers based on the following linear equations:

$$P_{1,1}T_{1,1} + P_{2,1}T_{2,1} + \ldots + P_{n,1}T_{n,1} = W_1,$$

$$P_{1,2}T_{1,2} + P_{2,2}T_{2,2} + \ldots + P_{n,2}T_{n,2} = W_2,$$

$$\ldots$$

$$P_{1,m}T_{1,m} + P_{2,m}T_{2,m} + \ldots + P_{n,m}T_{n,m} = W_m,$$

where N is the number of RFID readers and M is the number of RFID tags, and where $P_{i,j}$ is the charging power (charge value) from an RFID reader i to an RFID tag j (unknown value), where $T_{i,j}$ is the charging time (time value) that an RFID tag j provides in a response to the RFID reader i (known value), and where $W_i$ is the response threshold value for an RFID tag i. (known value). Hence, in the linear equation above, $T_{i,j}$ (that is, $T_{1,1}, T_{1,2}, \ldots, T_{n,m}$) and $W_i$ (that is, $W_1, W_2, \ldots, W_m$) are known, and the goal is to calculate variable $P_{i,j}$ (that is, $P_{1,1}, P_{1,2}, \ldots, P_{n,m}$) using algebra. In various embodiments, once $P_{i,j}$ is computed, the charging power (charge value) from an RFID reader i to an RFID tag j is known. Along with known charging time, distance between RFID reader i to an RFID tag j is hence determined.

In various embodiments, if the number of RFID tags is larger than the number of RFID readers, which is often the case, the system may directly determine the charging power pair value between any given RFID reader and RFID tag. In various embodiments, the system determines the distances from each robot arm's RFID reader to the RFID tags by solving simultaneous equations for all the RFID readers and RFID tags. In some embodiments, there is an equation for each RFID tag, where each equation includes the measured time interval (time value) for one RFID tag and each of the RFID readers relative to that RFID tag due to the sending of the charging signals the first time.

In various embodiments, if the number of RFID readers is larger than the number of RFID tags, the (N-M) robot arms may make some movement and re-measure the charging time to solve the equation. In various embodiments, the system moves the robot arms to new locations and sends the charging signals a second time, re-measuring the measured time intervals (time values) and determining the distances from each robot arm's RFID reader to the RFID tags by solving simultaneous equations for all of the RFID readers and RFID tags. In some embodiments, there is an equation for each RFID tag, where each equation includes the measured time intervals for one RFID tag and each of the RFID readers relative to that RFID tag due to the sending of the charging signals the first and second times.

Figure 5:
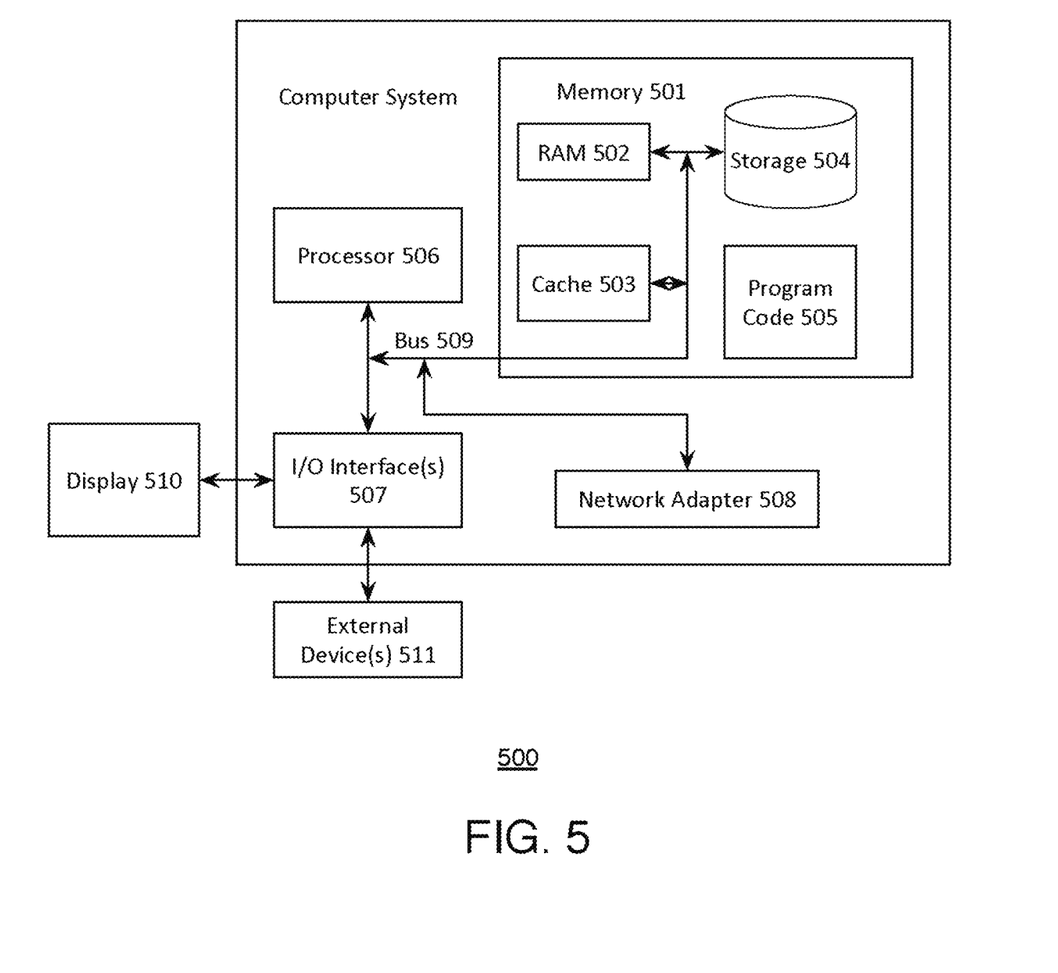
FIG. 5 is a block diagram of an example computer system, which may be used for embodiments described herein.

FIG. 5 is a block diagram of an example computer system 500, which may be used for embodiments described herein. In various embodiments, the server 102 and each robot such as robots 112 and 122 may include a computer system such as computer system 500 according to embodiments of the present invention, as illustrated in FIG. 5. The computer system 500 is operationally coupled to one or more processing units such as processor 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or storage 504, which may include non-volatile storage media or other types of memory. The memory 501 may include at least one program product having a set of at least one program code module 505 that are configured to carry out the functions of embodiment of the present invention when executed by the processor 506. The computer system 500 may also communicate with a display 510 or one or more other external devices 511 via I/O interfaces 507. The computer system 500 may communicate with one or more networks, such as communications network 110, via network adapter 508. The computing device 120 may also comprise many if not all of the components of the computer system 500.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for determining a location of an object in a three-dimensional space, the method comprising:
    charging a radio-frequency identification (RFID) tag with an RFID reader, wherein the RFID tag is coupled to an object, and wherein the RFID reader is coupled to a robot arm;
    receiving a plurality of responses from the RFID tag, wherein each response includes a power value to which the RFID tag was charged and a time value for charging the RFID tag to the power value;
    moving the RFID reader to a plurality of RFID reader positions using the robot arm, wherein each RFID reader position is associated with one of the responses of the plurality of responses;
    determining a plurality of distances from the RFID reader to the RFID tag based on the power values and the time values of the respective responses at the respective RFID reader positions, wherein the determining of the plurality of distances comprises:
        correlating the power values with the time values at different distances; and
        determining the plurality of distances from the RFID reader to the RFID tag based on the correlating of the power values with the time values at the different distances; and
    determining a location of the RFID tag based on the plurality of distances.

2. The computer-implemented method of claim 1, further comprising moving the robot arm to the object based on the location of the RFID tag.

3. The computer-implemented method of claim 1, wherein each time value is an interval between a start time of the RFID tag being charged and a response time that one of the responses was received.

4. The computer-implemented method of claim 1, wherein the RFID tag is simultaneously charged by a plurality of RFID readers of different robot arms, and wherein the RFID reader is charging a plurality of RFID tags, wherein the determining of the plurality of distances is based on combined power values.

5. The computer-implemented method of claim 1, wherein the RFID tag is simultaneously charged by a plurality of RFID readers of different robot arms, and wherein the RFID reader is charging a plurality of RFID tags, wherein the number of RFID positions is based on the number of RFID tags being charged by the RFID reader.

6. The computer-implemented method of claim 1, wherein the RFID tag is simultaneously charged by a plurality of RFID readers of different robot arms, and wherein the RFID reader charges a plurality of RFID tags, where the method further comprises determining a plurality of distances from the RFID reader to the RFID tag based on power values and the time values from the plurality of RFID tags.

7. A system comprising:
at least one processor and a computer readable storage medium having program instructions embodied therewith, the program instructions executable by the at least one processor to cause the at least one processor to perform operations comprising:
charging a radio-frequency identification (RFID) tag with an RFID reader, wherein the RFID tag is coupled to an object, and wherein the RFID reader is coupled to a robot arm;
receiving a plurality of responses from the RFID tag, wherein each response includes a power value to which the RFID tag was charged and a time value for charging the RFID tag to the power value;
moving the RFID reader to a plurality of RFID reader positions using the robot arm, wherein each RFID reader position is associated with one of the responses of the plurality of responses;
determining a plurality of distances from the RFID reader to the RFID tag based on the power values and the time values of the respective responses at the respective RFID reader positions, wherein the determining of the plurality of distances comprises:
correlating the power values with the time values at different distances; and
determining the plurality of distances from the RFID reader to the RFID tag based on the correlating of the power values with the time values at the different distances; and
determining a location of the RFID tag based on the plurality of distances.

8. The system of claim 7, wherein the at least one processor further perform operations comprising moving the robot arm to the object based on the location of the RFID tag.

9. The system of claim 7, wherein each time value is an interval between a start time of the RFID tag being charged and a response time that one of the responses was received.

10. The system of claim 7, wherein the RFID tag is simultaneously charged by a plurality of RFID readers of different robot arms, and wherein the RFID reader is charging a plurality of RFID tags, wherein the determining of the plurality of distances is based on combined power values.

11. The system of claim 7, wherein the RFID tag is simultaneously charged by a plurality of RFID readers of different robot arms, and wherein the RFID reader is charging a plurality of RFID tags, wherein the number of RFID positions is based on the number of RFID tags being charged by the RFID reader.

12. The system of claim 7, wherein the RFID tag is simultaneously charged by a plurality of RFID readers of different robot arms, and wherein the RFID reader charges a plurality of RFID tags, where the method further comprises determining a plurality of distances from the RFID reader to the RFID tag based on power values and the time values from the plurality of RFID tags.

13. The system of claim 7, wherein the charging of the RFID tag is performed wirelessly.

14. A computer program product for locating objects in a three-dimensional space, the computer program product including at least one computer readable storage medium having program instructions embodied therewith, the program instructions executable by at least one processor to cause the at least one processor to perform operations comprising:
charging a radio-frequency identification (RFID) tag with an RFID reader, wherein the RFID tag is coupled to an object, and wherein the RFID reader is coupled to a robot arm;
receiving a plurality of responses from the RFID tag, wherein each response includes a power value to which the RFID tag was charged and a time value for charging the RFID tag to the power value;
moving the RFID reader to a plurality of RFID reader positions using the robot arm, wherein each RFID reader position is associated with one of the responses of the plurality of responses;
determining a plurality of distances from the RFID reader to the RFID tag based on the power values and the time values of the respective responses at the respective RFID reader positions, wherein the determining of the plurality of distances comprises:
correlating the power values with the time values at different distances; and
determining the plurality of distances from the RFID reader to the RFID tag based on the correlating of the power values with the time values at the different distances; and
determining a location of the RFID tag based on the plurality of distances.

15. The computer program product of claim 14, wherein the at least one processor further performs operations comprising moving the robot arm to the object based on the location of the RFID tag.

16. The computer program product of claim 14, wherein each time value is an interval between a start time of the RFID tag being charged and a response time that one of the responses was received.

17. The computer program product of claim 14, wherein the RFID tag is simultaneously charged by a plurality of RFID readers of different robot arms, and wherein the RFID reader is charging a plurality of RFID tags, wherein the determining of the plurality of distances is based on combined power values.

18. The computer program product of claim 14, wherein the RFID tag is simultaneously charged by a plurality of RFID readers of different robot arms, and wherein the RFID reader is charging a plurality of RFID tags, wherein the number of RFID positions is based on the number of RFID tags being charged by the RFID reader.

19. The computer program product of claim 14, wherein the RFID tag is simultaneously charged by a plurality of RFID readers of different robot arms, and wherein the RFID reader charges a plurality of RFID tags, where the method further comprises determining a plurality of distances from the RFID reader to the RFID tag based on power values and the time values from the plurality of RFID tags.

* * * * *